United States Patent [19]

Kolesar et al.

[11] 3,750,345

[45] Aug. 7, 1973

[54] MACHINE TOOL

[75] Inventors: Daniel J. Kolesar, Troy; Charles W. Stahl, St. Clair Shores, both of Mich.

[73] Assignee: The Babcock & Wilcox Company, New York, N.Y.

[22] Filed: Mar. 6, 1972

[21] Appl. No.: 231,882

[52] U.S. Cl. ............................... 51/101 R, 90/13.4
[51] Int. Cl. ........................... B24b 7/00, B24b 9/00
[58] Field of Search .......... 51/93 R, 101 R, 101 LG; 77/61; 90/13.3, 13.4, 13.7

[56] References Cited
UNITED STATES PATENTS

| | | | |
|---|---|---|---|
| 2,592,875 | 4/1952 | Durland | 51/93 R |
| 3,170,374 | 2/1965 | Clar | 51/101 LG X |
| 3,555,739 | 1/1971 | Novak | 51/101 LG |
| 3,693,297 | 9/1972 | Cann | 51/101 R X |

FOREIGN PATENTS OR APPLICATIONS

| | | | |
|---|---|---|---|
| 957,922 | 5/1964 | Great Britain | 7/61 |
| 1,117,569 | 6/1968 | Great Britain | 51/101 R |

*Primary Examiner*—Othell M. Simpson
*Attorney*—J. Maguire

[57] ABSTRACT

A machine tool organization or assembly where a workpiece is mounted for lineal and rotational movement in relationship to a machine tool which is separately mounted for lineal movement relative to the workpiece. The movement of the workpiece is regulated by a cam while the movement of the machine tool is regulated by a template. The movements of both are coordinated to effect the formation of the workpiece shape to a high accuracy.

10 Claims, 6 Drawing Figures

MACHINE TOOL

The present invention relates to an improved production machine tool capable of a high degree of accuracy in the repetitive production of parts having either common or uncommon configurations. More specifically, the machine tool of the present invention accurately forms a material to a selected shape, and is particularly useful in finishing a metallic workpiece to a selected contour by cutting or grinding in close tolerance values.

In the shaping or forming of materials by machine tools many devices have been used such as by deforming, cutting or grinding. The choice of the particular type or kind of machine tool is influenced by the nature of the material to be shaped and by the configuration of the finished product, as well as the accuracy required for the finished product. In the selection of the proper machine tool for a particular workpiece material and the formation of a particular finished product it is normally necessary to consider whether the product is one of a kind, such as a custom job, where the operations of the machine may be manually or automatically controlled, or a repetitive job, such as a mass produced product, where it is desirable to automate the operational procedures of the machine tool.

In accordance with the invention, a machine tool assembly or organization is provided in which a workpiece is mounted on a slide for both rotational and lineal movement in a common plane in accordance with preselected motions. A power driven mechanism conjointly moves the slide with the workpiece thereon in a lineal direction while the workpiece is moved rotationally on the slide in accordance with the dictates of a cam, to form a two dimensional path of workpiece movement. Ordinarily, the third dimension of the finished product will be perpendicular to the plane of the two dimensional workpiece movement although the surface formed as the third dimension need not be either flat or perpendicular to the plane of two dimensional movement. The machine tool of the invention is mounted on a separate slide for movement in a lineal direction corresponding with the lineal direction of movement of the workpiece supporting slide. Actually the axis of lineal movement of the workpiece supporting slide and the axis of lineal movement of the machine tool supporting slide will lie in a common plane with the axes parallel and under some circumstances coincident. An accurately finished template is mounted directly on the workpiece supporting slide with a controlling follower interconnected with the tool supporting slide to cause lineal movement of the machine tool slide for accurate formation of the desired workpiece configuration. The accuracy of tool and workpiece relation is determined by the template which will have a uniform inclination on its grinding face with respect to the plane of workpiece movement, as will the face of the follower associated therewith. With the tapered relationship between template guiding surface and follower, the working surface of the machine tool and the template will be adjusted to exact and accurate alignment so as to compensate for changes in tool geometry and to maintain the axis of the follower and the tool coaxial.

Figure 1:
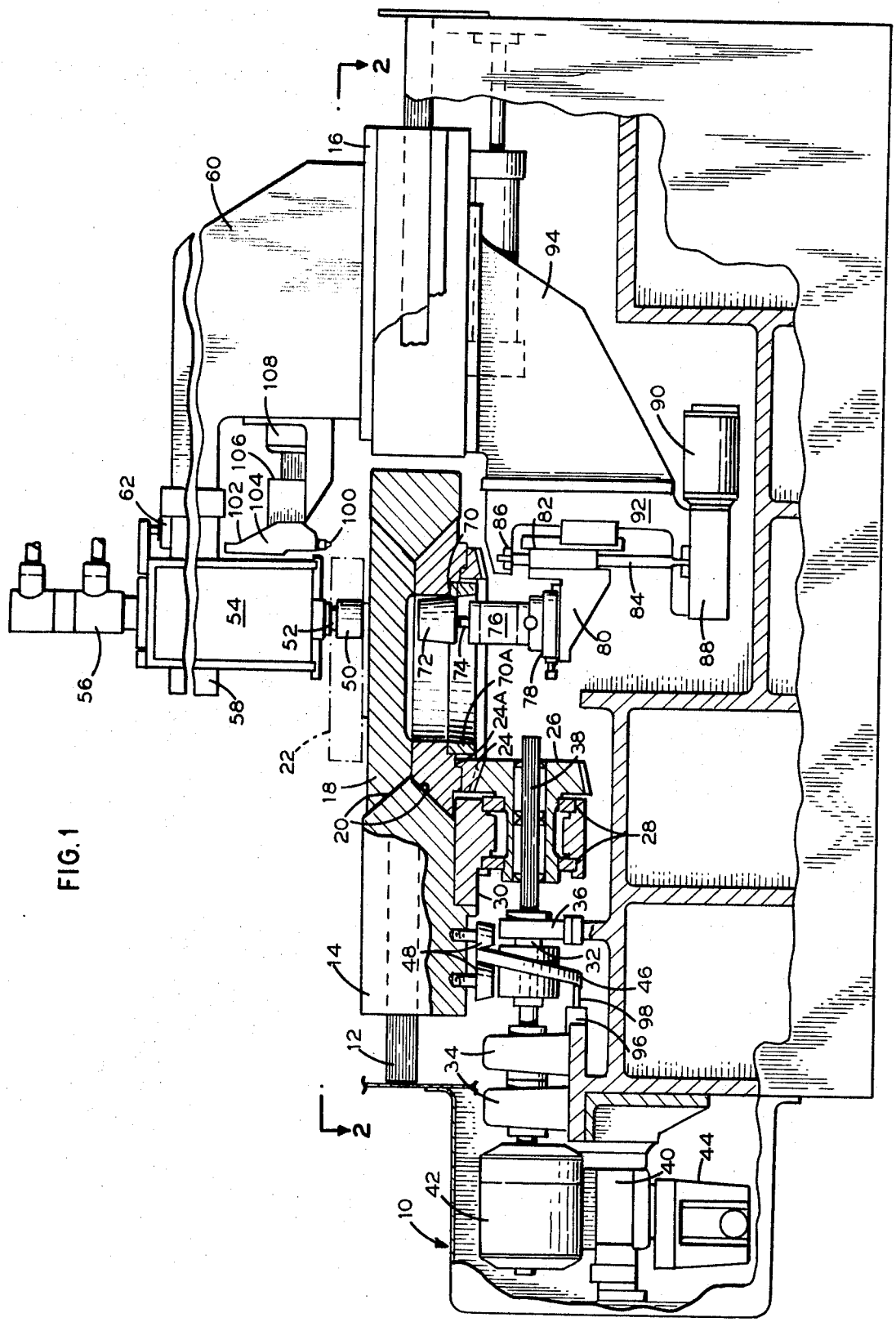
FIG. 1 is an elevation, partly in section, of a machine tool assembly constructed in accordance with the invention.

In the illustrated embodiment of the invention the machine tool assembly includes a grinder as the machine tool and the workpiece being shaped as an interior contour in two dimensional terms of a two-lobed epitrochoid. The third dimension is perpendicular to the plane of two dimensional configuration. It will be understood other configurations may be formed on the machine tool assembly of the invention where such configurations may be considered as irregular if a varying radius is used to define the shape. Other tool forms may be used such as a cutting tool, i.e. a milling cutter or even deforming tools such as a roller may be used.

GENERAL STRUCTURE

As shown in the drawings, the machine tool assembly includes a base 10 on top of which are two parallel ways 12. Mounted for reciprocating motion on the ways 12 are the primary slide 14 and the secondary slide 16. While these slides are on the same ways, their longitudinal propulsions are provided by separate motivating elements. The mounting of the slides 14 and 16 on the ways 12 includes hydrostatic stabilizing and lubricating means in accord with the highest developments in the state of the art. These hydrostatic means provide nearly frictionless movements of the slides along the ways. The hydrostatic means also provide very high orders of stability against tilt or skew of the slides relative to the ways. This stability is of great importance in contributing to the accuracy of the machine's operations.

PRIMARY SLIDE

The primary slide 14 includes a rotary table 18 which is circular and fits into a complementary circular opening in the slide 14. The table 18 has a V-groove formed in its periphery as indicated at 20. The complementary opening in slide 14 provides inclined surfaces which match the flanks of the groove 20 throughout its periphery. Provided in the mating surfaces to groove 20 are state of the art hydrostatic bearing means whereby the table 18 is rotatable within the slide opening. This hydrostatic bearing means provides nearly frictionless rotatability of the table within the primary slide. The hydrostatic bearing also assures a high degree of stability of the table rotation as regards constant center of rotation and freedom from wobble or change of plane of rotation.

The top surface of table 18 is provided with locating and securing means such as pins and bolts for releasably holding a work piece 22. A work piece for which the machine is preferably intended comprises an external or internal contour which is to be machined to a high order of precision. The contour illustrated is two-dimensional as projected to the plane of the table. The third dimension (depth or height) of the contour is everywhere perpendicular to the plane of the table 18. The contour considered here as an example is an inside contour having no sharp corners but having a decided deviation from circularity. Specifically, the exemplary contour is mathematically defined as a two-lobed epitrochoid. This particular contour is characterized by bilateral symmetry so that it has a true geometrical center.

The work piece is preferably located and clamped to the rotary table with the center of table rotation coincident with the center of the finished contour; that this preferential location is a convenience for description rather than an absolute requirement will appear later.

Typically, the work piece will have (before work by the machine) an internal contour approximating the contour to be realized in the finished product. However, this pre-worked contour will everywhere include finishing stock. That is, there will be material inside (toward the center) of the contour desired. The purpose of the machine is to remove the finishing stock. Preferably, the thickness of finishing stock should be relatively uniform to minimize variations in cutting load on the machine. However, the machine has adequate strength and rigidity to produce accurate finished contours when the finishing stock thickness varies over a range normal for this type of machinery.

Fixed to the underside of the rotary table 18 is a bevel ring gear 24. An upper cylindrical portion 24a of the gear 24 fits into an accurate counterbore in the table 18 to assure precise concentricity of the rotational axes of gear 24 and table 18.

Table 18 may be rotated by the bevel pinion 26 which meshes with bevel gear 24. A concentric hub or shaft portion of pinion 26 is mounted in precision anti-friction bearings 28. The outer races of bearing 28 are received in a bore of the bracket 30 which is secured to the underside of slide 14 outside the periphery of table 18.

A shaft 32 is supported near one end by axially preloaded precision anti-friction bearings 34 which are themselves suitably mounted on the machine base 10. The shaft 32 is further supported near its axial center by a radial anti-friction bearing whose housing 36 is also mounted on the machine base.

A portion of the length of shaft 32 extending to its end opposite bearings 34 is externally splined and received within precision ball-spline cartridges 38. The outer cylindrical surfaces of cartridges 38 are fitted within a central bore in the hub of pinion 26. The cartridges 38 are drivingly secured to pinion 26.

The shaft 32 is driven by a fluid motor 40 through a right-angle transmission 42. The speed of rotation of shaft 32 may be varied over a suitable range by means of the fluid control device 44 in a manner and for a purpose to be described hereinafter.

Rotation of shaft 32 causes rotation of pinion 26 and consequent rotation of table 18 about its vertical axis. Because of the spline connection between shaft 32 and pinion 26, the drive relation from motor 40 to table 18 is maintained if the slide 14 is moved to or fro along ways 12. In such case the bracket 30 moves with the slide keeping pinion 26 engaged with gear 24 and causing pinion to slip along the splines of axially stationary shaft 32.

Surrounding, and keyed to, shaft 32 between bearings 34 and 36 is a cylindrical cam 46. This cam is referred to as the primary cam or the gross cam. The ridge formed about the periphery of cam 46 assumes a varying angle relative to the axis of the cam cylinder (same as axis of shaft 32) which is designed in accord with the contour of the surfaces to be machined on the work piece. It is also notable that the ridge of cam 46 "closes on itself" forming, in effect, a wobble plate with a specifically designed wobble program.

Attached to the primary slide 14 by means of threaded studs are two cam follower rollers 48. These follower rollers have anti-friction bearings within themselves so that they may rotate freely about their respective supporting studs. The rollers 48 are positioned so as to maintain contact with opposite working flanks of the ridge on cam 46. The contacting surfaces of the rollers 48 are frusto-conical and the mating flanks of the cam ridge are formed at an angle to the cam axis such that contact between a roller and its mating cam flank occurs along an element of the active roller surface. The frusto-conical form of the rollers is to permit rolling of the rollers, without slipping, as the cam turns. That is, the portions of the rollers nearer the cam axis have smaller diameters so that the peripheral speed of roller and cam can be equal at respective points of contact. While not shown on the drawings, known structures are provided for forcefully urging one of the rollers 48 toward the other so as to create a preload that will prevent any lost motion between the rollers and the cam ridge.

It will be noted one complete rotation of the cam 46 by shaft 32 will cause one complete wobble cycle of the cam ridge. This wobble cycle is transmitted through the follower rollers 48 to the slide 14 which consequently makes one complete to-and-fro cycle or reciprocation along ways 12. The extent of the reciprocation of the slide 14 is determined by the configuration of the cam ridge. The instantaneous velocity and acceleration of the slide at any point in its reciprocation is jointly determined by the instantaneous angular velocity of shaft 32 and the configuration of the cam ridge.

The same rotation of shaft 32 which causes a reciprocation of slide 14 also causes rotation of table 18 by way of pinion 26 and gear 24. The extent (angle) of rotation of table 18 caused by one full turn of shaft 32 depends upon the ratio of pinion 26 to gear 24. Selection of this ratio depends upon characteristics of the work being done and will be discussed hereinafter.

TOOL SPINDLE

Material removal from the work piece is effected by a tool 50 which may, for example, be a milling cutter, or the like, but which is shown in this preferred embodiment as a cylindrical grinding wheel which tool 50 is mounted conventionally on the lower end of a vertical spindle 52. The spindle extends through a cylindrical housing or quill 54 within which the spindle is supported for relatively high speed rotation by high quality state-of-the-art hydrostatic bearings. The upper end of spindle 52 is attached to the shaft of a rotary driving means such as a fluid motor 56.

The quill 54 is mounted for vertical, non-rotating, axial motion in housing 58. The supporting and guiding relation of housing 58 to the quill 54 follows high quality hydrostatic practice.

The housing 58 is mounted to the rigid column 60 which, in turn, is mounted on the secondary slide 16. As previously explained, the slide 16 is hydrostatically mounted for precisely controlled motion along ways 12. However, for clarity and convenience, the description of means for moving slide 16 will be deferred. For the present, motions of slide 16 will merely be stated as occuring where necessary to complete the description of the action of slide 14 and related members. Vertical motion of the quill 54, when required, is effected by means of a cylinder-and-piston type hydraulic actuator 62.

OPERATION USING PRIMARY SLIDE

To permit loading of a work piece 22, the tool 50 is raised clear of the work height by means of actuator 62 acting through quill 54 and carrying the spindle 52 upward. The work piece is preferably loaded with the geometrical center of its to be finished contour coincident with the rotational axis of table 18. The locating and holding fixture fixed to the table will assure this proper location.

Next, slide 16 is so positioned so that the tool 50 is positioned horizontally within the vertical confines of the unfinished contour of the work piece. Then the tool is lowered by actuator 62 until the vertical height of the tool corresponds with the vertical extent of the contour to be finished.

The next operation is to move slide 16 to the right as shown in FIG. 1 until the tool engages the work piece to a depth suitable for the first cutting pass around the contour. With the tool so engaged, the motor 40 is put in operation so that it turns shaft 32.

As shaft 32 turns it rotates table 18 through pinion 26 and ring gear 24. This rotary motion of table 18 causes tool 50 to perform a metal cutting operation (at the above set depth) around the periphery of the contour. However, since it is assumed here that the contour of the cavity in the work piece is not circular, it is necessary to provide radial motion of the work piece relative to the tool.

As previously explained, rotation of shaft 32 also turns the cam 46 which, in turn, produces linear motion of slide 14 along ways 12. This latter motion varies the location of the work piece relative to the tool in accord with the prefabricated configuration of the ridge on cam 46. This cam configuration, of course, determines the radial variations of the work piece relative to the tool location.

Because of the symmetry of the work piece, the contour created during one half-revolution of table 18 is to be repeated in the next half-revolution. For this reason, the ratio of pinion 26 to gear 24 is 2 to 1. Thus, the cam 46 makes one complete revolution while the table 18 turns 180°. After one complete revolution of table 18 (two revolutions of cam 46) the slide 16 is moved slightly to the right and a second layer of material is removed from the contour during the next revolution of table 18. This process is repeated until the desired contour is attained.

LIMITATIONS OF PRIMARY SLIDE OPERATION

In principle, the process described in the preceding section could be used to machine work pieces completely. However, this process suffers from certain limitations where high precision of the finished contour is required such as R-Theta error. Among the other significant of these limitations are:

A - No means for determining when the final shape and size of the contour has been attained has been described.

B - No means for taking account of tool wear has been described.

C - The configuration of cam 46 is derived from the desired perfect finished contour. However, the cam 46 is not a replica of the finished contour. Even with the greatest care in design and fabrication it is extremely difficult to derive a form from a non-similar form with the extremely high accuracy here contemplated.

D - Since, as already described, the cam 46 causes slide 14 to move both ways in the course of a revolution and also at varying velocities, it follows that there are forces due to acceleration exerted between the cam and the slide. These forces inevitably must result in some degree of deflection of the ridge of cam 46 and, perhaps more important, in some deflection of the studs which hold the follower rollers 48 to slide 14. Further deflections due to acceleration forces will occur in the bearings 34 which must sustain longitudinal thrust axial of shaft 32.

R-THETA ERROR

Figure 4:
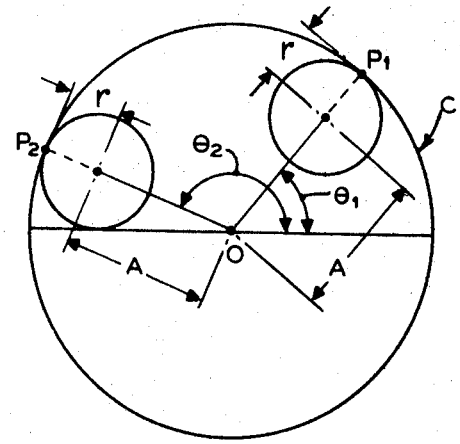
FIGS. 4, 5 and 6 illustrate diagrammatically problems in machine tool operations in forming irregular shapes.

In FIG. 4 let $R = A+r$. If curve C is a circle centered at O, point P, is correctly defined in polar coordinates by $(R,\theta_1)$ and $P_2$ by $(R,\theta_2)$, etc. Where R, A and r are constants. The small circle of radius r is, at each designated point P, tangent to the circle C. It is to be noted that A is the distance from the origin O at the center of circle C to the center of the small circle of radius r. In the above case, A lies along a radius of C and a diameter of the small circle.

Thus, for a circular curve, the point of tangency between that curve and the moving circle gives the true polar location of a point on the curve ($\theta$ being the angular location of the connecting vector between large and small circles).

Figure 5:
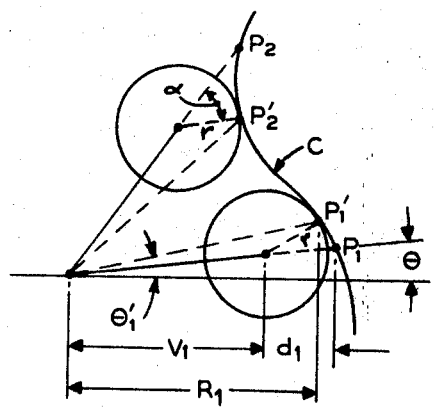

In FIG. 5, C is not a circle centered at O. The vector V connects the center of the circle of radius r to O and varies so that the small circle is always tangent to the curve C at some point such as $P^1_1$, $P^1_2$, etc.

When vector $V_1$ is at angle $\theta_1$, $V_1+d_1$ is the R coordinate of a point $P_1$, not the point of tangency $P^1_1$. The true coordinates of the point of tangency $P^1_1$ are $(R_1, \theta^1_1)$. If it be assumed that the point of tangency is defined by $V_1+d_1$ and $\theta_1$ then the definition is in error in both R and $\theta$. The same sort of error is shown for point of tangency $P^1_2$.

Any generation of a non-circular curve by means of points of tangency of a circle whose center is linked to a fixed point is subject to the above deviations from a true polar coordinate definition of points on the desired curve.

The deviation described above may be called the "Geometrical R-Theta" error of the attempted generation.

Figure 2:
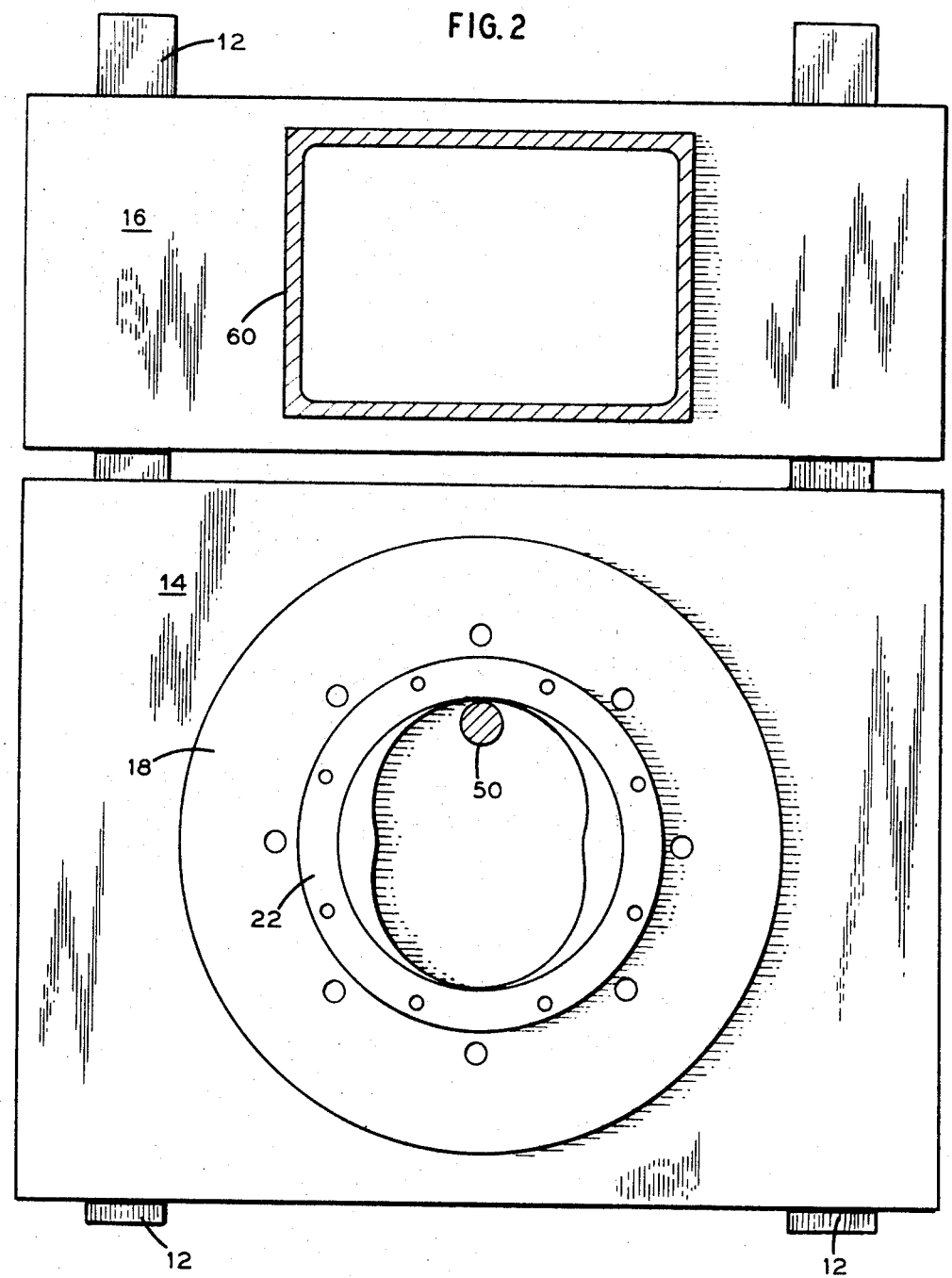
FIG. 2 is plan section of a portion of the machine tool assembly taken along line 2—2 of FIG. 1.
Figure 3:
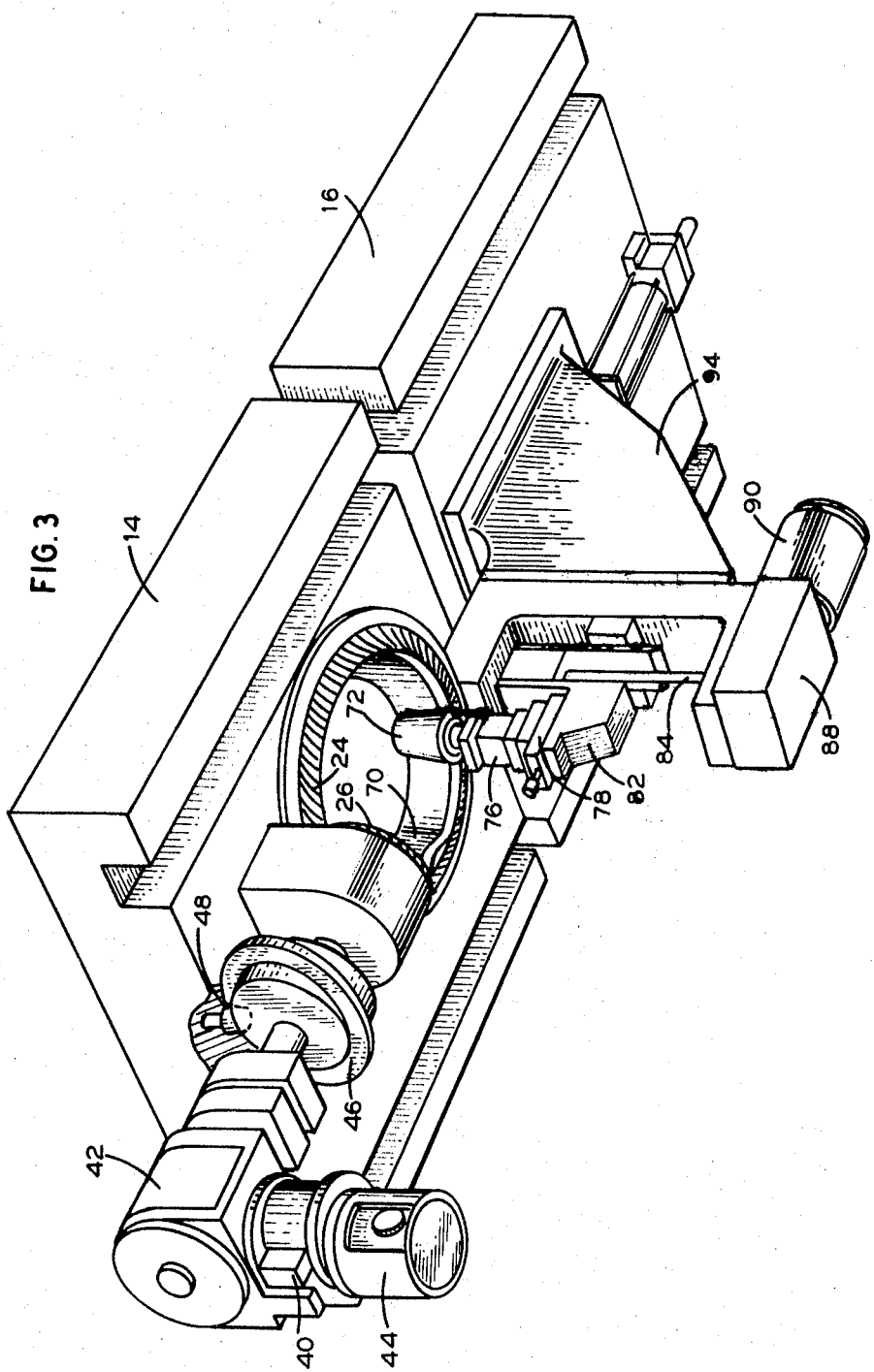
FIG. 3 is a perspective view of the lower portion of the machine tool assembly shown in FIG. 1.

The same FIG. 5 also illustrates a separate consideration known as attack angle shift which relates to work surface speed changes in its relationship to the machine tool 50. This is shown in FIG. 2 in the angle between the points $P_2$ and $P^1_2$ when compared with the angle between the points $P_1$ and $P^1_1$. This consideration must be evaluated and solved in any non-circular curved configuration, and is particularly important in forming a configuration having reentrant curved surfaces.

Figure 6:
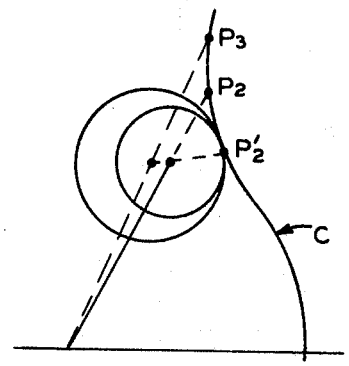

The solid parts of FIG. 6 are intended to be the same as the parts of FIG. 5 pertaining to point $P_2$. It is clear that a change in the radius r of the circle as shown by dotted lines changes the R-Theta combination associated with the tangency point $P^1_2$. This diameter change is a second contributor to total R-Theta error.

Machine deflections such as wind-up and backlash, contribute in a demonstrably way to this error. It will also be noted a similar consideration of attack angle shift occurs in FIG. 6 regarding angle and tool radius as has been discussed in considering FIG. 5.

In short, the described functions of the primary slide 14 and the primary cam 46 are very important since they constitute the hard work. However, imperfections in the product necessarily result from the hard work or brute force part of the machine's operation. The secondary slide 16 and its accessories serve to minimize (essentially eliminate) these residual imperfections, as will now be described.

SECONDARY SLIDE OPERATION

In the preceding section, it has been assumed that the vertical axis of the tool 50 is stationary except for increments of motion at the conclusion of each rotation of table 18. Actually, the location of the tool axis is under precise control and is subject to slight motions dictated by imperfections of primary slide 14 motion.

As previously explained, the tool 50 is carried by the secondary slide 16 and the position of the tool axis is changeable by motion of slide 16. The control for motions of slide 16 will now be described.

Attached securely to the underside of table 18 is a secondary cam or template 70. This template is a true (full 360°) pattern of the contour to be generated. The cavity contour of the template differs from the desired cavity of the work piece in one respect only. While the workpiece cavity periphery is to be perpendicular to the faces of the workpiece, the cavity wall of the template 70 is tapered. At some plane lying parallel to, and between, the faces of the workpiece, the contour of the template is exactly that desired for the full depth of the finished workpiece. Above this plane, the template has the same general shape but is closer to the geometrical center. Likewise, the portions of the template below the mentioned plane are farther from the center. The tapered configuration is shown by the angle as indicated at 70A.

Mating with the tapered contour of template 70 is a tapered follower roller 72. This roller is supported by precision anti-friction bearings within itself which are mounted on rod 74. This rod is the actuator for a servo-control valve 76. The frusto-conical tapered roller 72 has a minimum diameter (upper end) smaller than the smallest diameter of tool 50 when that tool has been worn and/or dressed to its smallest useful diameter. The larger diameter end of roller 72 has a diameter greater than the maximum diameter of a new tool 50 suitable for use on the machine. Thus, between the ends of roller 72, there will always be a plane at which the roller diameter is exactly equal to that of tool 50.

The Servo-control valve 76 is mounted on a compound slide table 78 which permits mutually perpendicular adjustments horizontally for purposes to be explained. The table 78 is supported by a bracket 80. In a vertical bore through a section of bracket 80 are two precision nuts 82 which engage the precision elevating screw 84. The upper end of screw 84 is rotatably received in an anti-friction bearing 86. The lower end of screw 84 passes through an anti-friction bearing into a driving assembly designated generally by 88. The assembly 88 comprises a gear-box whose input is driven by the stepping motor 90. The driving assembly 88, motor 90 and bearing 86 are all carried by a bracket member 92. Member 92 is carried by a larger bracket 94 secured to the underside of slide 16.

If the roller 72 is out of contact with the template 70 (such as being within the cavity of the contour but not touching it), the actuating rod 74 of servo-valve 76 will be spring biased (internally of the valve) a very slight amount (vider of one, or a very few, thousandths of an inch) to the right of vertical. In this biased position, valve 76 causes fluid flow from a hydraulic power source, not shown, to a cylinder-and-piston type actuator (shown only on the perspective drawing) which will move slide 16 toward the right. This motion is relatively slow and brings the roller into contact with the template 70. The rod 74 will yield to further motion of slide 16 until rod 74 is vertical and roller 72 makes continuous contact with the template along the tapered configuration. When the rod 74 is precisely vertical, the valve 76 cuts off fluid supply to the actuator of slide 16 which then stops.

In the setting up of the machine, the cross-slides of table 78 have been so adjusted that the axis of roller 72 (extended) coincides precisely with the vertical axis of the tool 50 when rod 74 is vertical. If the rod 74 should be deflected to left of vertical, the valve 76 will cause hydraulic power to move slide 16 to the right. Thus slide 16 responds to deflections of roller 72 so as to maintain the axis of the roller coincident with the axis of the tool 50. It should be noted that the servo-hook connecting valve 76 with the actuator of slide 16 includes known damping means to minimize any tendency for the slide to oscillate about its commanded position although a roller deflection of only a small fraction of an inch is sufficient to cause slow corrective motion of slide 16.

The tapered form of roller 72 and the template 70 is a very special feature of this machine. Neglecting, for now, any rotation of table 18, driving the roller upward, by means of screw 84, will cause leftward deflection of roller 72 and consequent leftward corrective motion of slide 16. Likewise, lowering the roller will cause slide 16 to move to the right. As a consequence, if the diameter of the roller which corresponds to the diameter of the tool 50 is at the level of the true desired contour on the template, then the tool perimeter will be tangent to the desired contour of the workpiece. If, however, the roller 72 is raised somewhat above the just described position, the slide 16 will respond and move the tool toward the geometrical center of the workpiece.

COMBINED OPERATION OF PRIMARY AND SECONDARY SLIDES

Suppose that all moving parts of the machine are stationary and that the tool 50 has been raised high enough to permit loading a workpiece on table 18. The workpiece is placed on the table, properly located and secured. The workpiece loaded is assumed to have metal on its cavity walls inside the desired finished contour but the cavity has the general shape to be finished.

Suppose further that a new tool 50 has been installed on the spindle 52 so that it has the maximum diameter permissible. Before lowering the tool, the roller 72 must be raised by means of stepping motor 90 and screw 84 so that the diameter of the roller corresponding to the new diameter of the tool is well above the finished size level on the template 70. This condition will cause the slide 16 to position the tool 50 above the open space within the workpiece cavity.

Next, the tool is lowered by means of actuator 62 and quill 54.

The motor 40 may now be started which will rotate shaft 32, table 18 and cam 46. As previously described, the cam 46 causes reciprocation of slide 14 and coordinated rotation of table 18. Now, however, the varying radius (from geometric center) of template 70 also may cause deflection of the roller 72 either way from its neutral position (axis vertical). Theoretically, there should be no deflection of the roller because the contour of the cam 46 should cause the slide 14 to move linearly in exact synchronism with the rotation of table 18 in such a way as to account exactly for the varying radius of the pattern contour relative to the center of table 18. However, this perfect coordination is subject to the discrepancies mentioned above under "Limitations of Primary Slide Operation." Thus, the roller 72 is expected to experience slight deflections, first one way and then the other, in the course of a revolution of table 18 (two revolutions of cam 46). As explained, these slight deflections result in correspondingly slight motions of slide 16. In this way, the tool 50 is maintained at a constant distance from the desired eventual finished contour of the workpiece. While cam 46 is doing the major part ("hard work") of maintaining the tool and workpiece in proper relative working relation, refinements on this function are being accomplished by the servo-loop controlled by roller 72. These refinements involve no fast slide velocities and no large acceleration forces so that a close approach to perfection can be produced.

During the operation just described, the tool 50 has been maintained inside the original cavity of the workpiece and no metal has been removed.

The next step is to move the roller 72 downward by means of the screw 84. This downward motion tends to cause the roller to lose contact with the template 70 and so to permit rod 74 to be spring deflected to the right. The slide 16 responds by moving the tool 50 to the right and so nearer the metal in the workpiece cavity. Roller 72 is moved downward exactly enough to permit the tool to "bite into" the workpiece material to the desired depth for preliminary or "rough" cutting. For grinding, this depth may be about 0.001 inch.

The method of controlling the downward motion of roller 72 includes transmitting a predetermined number of voltage pulses to the stepping motor 90. Each pulse may, for example, produce 0.0001 inch of downward motion of the roller; thus, providing a high order of control resolution. The electronic circuitry for providing these pulses is known and determining the exact number required is not included in this general functional description of the machine. The same is true of other control functions to be mentioned.

When the proper cutting depth has been attained, the table 18 is permitted to make one full revolution. Thereupon, a second series of pulses is transmitted to motor 90 to cause a further in-feed of about 0.001 inch. This process is continued until the tool periphery is very close to the desired finished contour of the workpiece. This completes the roughing cut.

If the tool is a grinding wheel, it is feasible to make the last roughing cut with the new-tool diameter of roller 72 in exact coincidence with the plane of the final desired contour on the pattern. This is true because, in the nature of the process, some of the abrading material of the grinding wheel will have been worn away, making the wheel diameter less than it was at the start. In practice, it may be preferable to terminate the roughing process with the roller 72 slightly above that suggested above so as to assure adequate remaining material for finishing.

Upon termination of the roughing operations, roller 72 is automatically raised a predetermined amount to cause the tool to move inward away from contact with the work.

PRIMARY SLIDE SPEED CONTROL

Before describing the finishing operation there remains one important feature of the primary slide drive which has not been discussed. It was omitted earlier because its significance was not readily understandable until the present stage of explanation.

In practically all kinds of metal cutting, it is important that the cutting tool shall proceed along the material at some speed determinable from the character of the tool and the material being cut. In the case here discussed, this speed is a combination of the peripheral speed of the tool and the momentary tangential velocity of the workpiece at the point of cutting contact. The tool rotation speed is held constant except for certain incremental speed changes yet to be described. It is therefore desirable also to hold the tangential velocity of the work piece also constant.

However, as has been emphasized before, the radius from the center of the table 18 to the point of contact of the tool is variable because of the form of the contour. If the rotational speed of table 18 were held constant, the resultant tangential velocity at the point of cutting would be variable (by geometry). Thus, to maintain constant tangential velocity, it is necessary to introduce variation into the rotational speed of table 18 which is coordinated with the working radius at a given time.

Since the position of slide 14 is a direct analog of the working radius at a given time (except for slight variations in the position of slide 16 which is negligible for this purpose), a signal can be taken from the position of slide 14 and used to control the speed of motor 40 and thereby the speed of table 18. In the drawing, the sensor for the position of slide 14 is shown as the Linear Variable Differential Transformer (LVDT) indicated by 96. As shown, the movable plunger 98 which controls the output voltage of this sensor is held (by a spring not shown) against a flank of the rim on cam 46. Since that cam rim determines the position of slide 14, sensor 98 thus produces a controlling signal coordinated with the position of slide 14. This or a different type of sensor could be otherwise related to the position of slide 14. In any case, the signal from the sensor such as 98 is utilized to control the speed of motor 40 for the purpose of maintaining constant work tangential velocity resulting from part radius, attack angle and tool diameter.

FINISH MACHINERY

Resuming description of the machine operation, the roller 72 had been raised after the roughing operation and this had caused the tool 50 to move inward away from the work surface.

The tool is now raised above the workpiece by means of actuator 62 and quill 54.

When the tool (grinding wheel now being considered) is sufficiently raised, it is stopped to allow positioning of the dresser tool.

The dresser tool is a single diamond point 100 mounted by means of a shank in the pivoted dresser holder 102. Dresser holder 102 is pivoted about a pin at 104 fixed in a slide 106 mounted for horizontal motion on a portion of the spindle support bracket 60.

When the quill 54 is sufficiently raised to permit clearance, the holder 102 is rotated, by means of an air actuator (not shown), clockwise about the pin 104 until the shank of the dresser tool is horizontal and the diamond point 100 is positioned vertically just above the upper end of wheel 50.

The dresser tool slide 106 is movable radially of the main tool spindle 52 by means of a stepper motor 108 and a screw-and-nut actuator, not shown. The control system now provides a series of voltage pulses to the stepper motor 108; causing the dresser slide 106 to move the diamond point 100 toward the axis of spindle 52.

The number of pulses delivered to motor 109 is preset or programmed to move the diamond point a precise distance from where it was left at the end of its last movement. Specifically, the diamond point was previously left to the right of the spindle axis a distance exactly equal to the radius of the grinder wheel 50. The number of pulses now delivered to the stepper motor is determined by the precise amount of reduction of wheel radius desired before the finishing operation yet to be performed on the workpiece.

As has been previously mentioned herein, and known in the grinding art, the rough grinding operation caused some reduction in wheel radius due to wearing away of particles from the wheel working surface. It is also known that this wear was probably not perfectly uniform so that the wheel surface is not now a perfectly smooth cylinder. Furthermore, while the amount of wheel radius reduction will be known to a close approximation (by experience), it will not be known exactly.

The amount of inward motion of the diamond is programmed to establish a new wheel radius slightly smaller than the reasonably assumed worn radius and small enough to lie beneath the effects of any irregularities or pitting caused by the rough cut.

The stepper motor 108 provides increments of inward motion of the diamond in the order of 0.0001 inch so that the desired new wheel radius can be set to a high order of accuracy.

When the position of the diamond point 100 has been precisely set, the actuator 62 is caused to move the diamond point slowly downward across the working surface of the still rotating wheel of tool 50. During this downward motion, the diamond point acts as a lathe tool on the grinding wheel, removing surface imperfections and producing a new, precisely defined radius on the grinding wheel. When the diamond point has passed the lower end of tool 50, the actuator 62 is automatically reversed and the diamond point passes upward along the same path. Due to probable slight deflection of spindle 52 during the downward cut, the diamond point is likely to touch the wheel very lightly during its upward motion and so further perfect the renewed wheel surface. Although this second pass of the diamond over the wheel is so light as to make deflection of the spindle unlikely, further down and up motions of the diamond may be programmed into the cycle to attain the utmost perfection of the grinding wheel for finishing. The just described interaction of diamond point and grinding wheel is known in the art as dressing of the wheel. Although it was not feasible to describe dressing earlier in this discussion, it is contemplated that a new wheel will be dressed before it is used. The purpose there is to establish a definite wheel radius before setting the height of roller 72 for the roughing operation.

Simultaneous with sending pulses to motor 108 to establish the dressed radius of wheel 50, the same or a mathematically related number of pulses is sent to motor 90. The purpose of these pulses is to establish a height of the roller 72 for the finishing operation. This positioning of the roller 72 is now related to the new radius of wheel 50, since the pulses to motors 108 and 90 are so coordinated. Specifically, roller 72 is positioned relative to template 70 so the wheel 50 may now be lowered and will be out of contact with, but in close proximity to, the material yet to be removed from the contour of the workpiece.

The same signal which furnished properly correlated pulses to motors 90 and 108 also serves to adjust the speed of the spindle motor 56. This motor speed is adjusted to produce the same peripheral wheel speed after dressing as before, or a different speed could be programmed if so desired.

Before lowering wheel 50, bracket 102 is returned counterclockwise to its original position as shown. This will allow the quill 54 clearance to lower the wheel 50 to operating level relative to the workpiece 22.

When the wheel is lowered, the finishing operation proceeds exactly as described for the roughing except that the incremental infeed for each revolution of table 18 will preferably be less than it was in roughing. By infeed is meant the depth of bite of the wheel into the material of the workpiece.

The control system provides that the downward increments of the follower roller will stop when the radius of the roller corresponding to the dressed radius of the wheel exactly corresponds to the true-contour level of the pattern 70. This latter provision assumes there is no wear of the wheel during the finishing operation. This assumption is justified by the few revolutions necessary to remove the slight amount of material left for finishing.

At the conclusion of finishing, the table 18 should be allowed to make one or a few extra turns, without further in-feed. This allows any minute amount of deflection of the spindle 52 to relax and take off an infinitesimal amount of additional material. The extra turns after the cessation of in-feed is called "sparking-out" since sparks will appear so long as any material is being removed.

What is claimed is:

1. A machine tool organization comprising means for mounting a workpiece for rotational movement of said mounted workpiece, a cam and follower mechanism driven by the power drive means for conjoint movement of the workpiece in a lineal direction during its rotational movement to follow a selected two dimensional contour of workpiece movement, means for regulating the conjoint movement of the workpiece to eliminate the R-Theta error in forming an irregular shape, means for separately mounting a rotatable machine tool for lineal movement along the axis of the lineal movement of the workpiece, means for rotating the machine tool, a template attached to the workpiece mounting means in a plane parallel to the plane of movement of the mounted workpiece and accurately formed to the desired finished contour of the workpiece, the guiding edge of the template being inclined with respect to the perpendicular of the workpiece common plane, and means including a frusto-conical follower engaging the guiding edge of the template to position the working surface of the rotatable machine tool so as to compensate for changes in tool geometry and to maintain the axis of the follower and the tool coaxial for accurate formation of the workpiece.

2. A machine tool organization according to claim 1, wherein a fixed base is formed with horizontally disposed parallel guideways in its upper surface, and the workpiece mounting means includes a slide positioned for lineal movement in in the guideways.

3. A machine tool organization according to claim 2 wherein the workpiece is affixed to a rotational table supported in the slide.

4. A machine tool organization according to claim 3 wherein the power drive means includes a shaft disposed for rotation about an axis parallel to and spaced below the guideways of the slide, the shaft being positioned by bearings attached to the fixed base.

5. A machine tool organization according to claim 4 wherein a pinion is mounted for rotational movement on an end portion of the shaft and for axial movement on a splined bearing attached to the workpiece slide.

6. A machine tool organization according to claim 5 wherein the pinion engages a gear attached to the workpiece table for rotational movement of the table and the workpiece attached thereon in response to the rotation of the shaft.

7. A machine tool organization according to claim 4 wherein the cam is attached to the shaft in fixed relationship to the base, and the cam follower mechanism is attached to the slide for responsive lineal movement of the slide.

8. A machine tool organization according to claim 1 wherein the conjoint movement of the workpiece is regulated in accordance with a continuous indication of the position of the cam.

9. A machine tool organization according to claim 1 wherein the machine tool is a grinding wheel, and means coordinate the frusto-conical follower to engage the guiding edge of the template in exact radius relationship with the grinding wheel.

10. A machine tool organization according to claim 9 wherein the coordinating means include a wheel dresser positioned by a stepping motor, and a coordinating stepping motor positioning the frusto-conical follower vertically with respect to the guiding edge of the template.

* * * * *

UNITED STATES PATENT OFFICE
CERTIFICATE OF CORRECTION

Patent No. 3750345                          Dated  Aug. 7, 1973

Inventor(s) Daniel J. Kolesar, et al.

It is certified that error appears in the above-identified patent and that said Letters Patent are hereby corrected as shown below:

Claim 1.

Col. 12, line 55, after the comma (,) insert --- a power drive means, ---

Signed and Sealed this twenty-sixth Day of August 1975

[SEAL]

Attest:

RUTH C. MASON
*Attesting Officer*

C. MARSHALL DANN
*Commissioner of Patents and Trademarks*